United States Patent Office 2,776,891
Patented Jan. 8, 1957

2,776,891

PRODUCTION OF SYNTHETIC COCONUT WATER

Eliseo Luque, Naguabo, Puerto Rico

No Drawing. Application April 10, 1952,
Serial No. 281,663

3 Claims. (Cl. 99—22)

The present invention relates to the production of coconut essence and its utilization in the production of a carbonated beverage.

In accordance with the present invention, coconut oil is produced from the coconut meat of ripe coconuts. The coconut oil which is obtained in accordance with the present invention is thereafter digested with a mixture of alcohol and water to produce coconut oil and an aqueous alcohol extract containing certain ingredients which have been extracted from the coconut oil by the action of the aqueous alcohol solvent on the coconut oil. It is this alcoholic extract which contains the coconut flavor originally present in the coconut oil and which constitutes the essence of coconut of the preesent invention which may be diluted and carbonated to produce a coconut-flavored carbonated water containing certain beneficial ingredients present in the coconut oil.

It has been discovered that as long as the coconut oil is not diluted with the aqueous alcohol extracting agent that the coconut oil may be processed in iron or steel containers. However, when the coconut oil is treated with an aqueous extract of alcohol and the extract allowed to cool, if the container in which it cools is made of a stainless steel or glass or is a steel container which has a vitreous lining, the alcoholic extract exerts no action upon the walls of the container.

It is to be understood that the alcoholic extract obtained from the coconut oil, said extract having the coconut flavor of coconut oil, is diluted with further amounts of water. The resulting diluted extract if it has not been made in a container of the character described may have its properties materially changed by reaction with the interior lining of the container. However, if the alcoholic aqueous extract is made from the herein produced virgin coconut oil in containers of the character set forth, then the raw concentrate which is produced will not ferment, disperse, or precipitate any constituents thereof when the raw concentrate is diluted with water, carbonated, and bottled.

In carrying out the invention, about 1400 pounds of coconut meat obtained from ripe coconuts are treated with 96 gallons of water which is roughly about 700 pounds of water. Roughly, the coconut meat should be treated with water in an amount between 35% and 60% taken on the weight of the ripe coconut meat, that is, the meat that is obtained by crushing the shell of the coconuts and separating the coconut meat from the shell. While the water may be at room temperature, it is preferable to have the water at a temperature ranging between 100° and 150° F. The coconut meat is crushed to a relatively fine state in order that the water may readily act upon the coconut meat. While it is not desired to be limited to any particular size range of the coconut particles, satisfactory results are obtained if the coconut meat is crushed to pass through 100 mesh.

The mixture of the finely divided coconut meat and the water is agitated to disperse the particles of coconut meat therein.

The mixture of water and coconut particles preferably has a consistency which is somewhat better than 32° Bé. syrup. This consistency enables the mixture of coconut meat and water to be pressed so that the milk of the coconut meat will flow therefrom. All the expressible constituents of the coconut meat are expressed therefrom in a suitable press. Usually the resulting aqueous mixture of coconut pulp is introduced into a press and disposed on a screen which has a very much finer mesh size than the size of the coconut particles. When pressure is exerted on the press, the liquid component of the pulp including the milk of the coconut and the water, flows through the lower supporting screen of the press. This procedure removes from the coconut pulp a very substantial portion of all the coconut oil present therein and other constituents which can be expressed out by pressing in the presence of water. Usually, of the total oil present in the coconut pulp, between 80% and 90% is recovered.

The residue on the pulp screen from which the coconut oil has been pressed may be used for chicken and hog feed.

While the milk present in the coconut pulp may be expressed therefrom without having present a carrying or dispersion medium, such as water, more satisfactory results are obtained when the coconut meat is mixed with the water and expressed in the presence of water.

The resulting coconut milk dispersion or solution may then be introduced into steel tanks and maintained therein in a quiescent state during which time the coconut milk product separates into a lower layer of water on the bottom of the tank and an upper oily layer which contains the constituents of the coconut meat which have been pressed therefrom, said oily layer having a consistency approximately of lard at ordinary temperature.

The treatment time to effect separation of said components may vary from 8 to 20 hours. The treatment period is relatively short in order to avoid any fermentation or decomposition of the oily layer which contains the coconut oil removed from the coconut meat.

The lard-like material is then treated in an iron kettle for a period of time which will evaporate the water-content of the lard-like material containing the coconut oil constituent. A large portion of the liquid content of the coconut oil, said liquid content being mostly water, is driven out of the lard-like layer and the mixture while in a liquid state is filtered to separate the solid constituents from the liquid constituents. The latter forms a filtrate which is refined coconut oil and is herein designated "virgin" coconut oil.

The above process of producing the refined or virgin coconut oil may be carried out in iron or steel vessels. However, when the coconut oil is treated with an alcohol to extract the coconut flavoring constituents of the oil and other constituents, it is highly desirable that the extraction process be carried out in vessels, the interior surfaces of which are substantially chemically inert with respect to the mixture of coconut oil and alcohol and to the alcoholic extract produced therefrom. The treatment vessels preferably have interior surfaces of stainless steel, glass, vitreous enamel, or other material which is chemically inert and bacteriologically inert relative to the material being treated therein.

In order to produce the essence of coconut, the virgin coconut oil is mixed with alcohol, preferably 190 proof. Satisfactory results can be obtained by mixing 100 gallons of the virgin coconut oil with 100 gallons of alcohol. This mixture is thoroughly agitated and hot boiling water added. The amount of water added may vary but may be about 30–40 gallons. The mixture is then agitated and allowed to cool and stand for a period of time whereupon the coconut oil rises to the top of the stainless steel container in which the material is being processed and there remains a bottom layer comprising a relatively dilute aqueous alcoholic solution which constitutes the essence of coconut of the present invention, said bottom layer being thoroughly impregnated and containing as an essential constituent the coconut flavoring compounds originally present in the coconut meat pulp. Instead of adding about 30 or 40 gallons of water to the mixture formed by mixing 100 gallons of virgin coconut oil with 100 gallons of alcohol, the hot water which may be at or adjacent the boiling point, may be materially increased as, for example, to between 300 and 500 gallons of hot water, and preferably about 400 gallons. The preferred procedure is to add the larger amount of water to the mixture of virgin coconut oil and alcohol.

The layer of material at the bottom of the stainless steel or equivalent container is withdrawn therefrom and constitutes the raw concentrate which may be diluted with water and then there may be added thereto flavoring constituents including sugar and preservatives. Thereafter, the mixture is carbonated and bottled. All of the latter steps of processing the virgin oil are carried out in containers which are chemically and bacteriologically inert with respect to the virgin coconut oil.

It has been stated that the coconut milk dispersion may be treated in steel tanks and maintained in a quiescent state during which time the coconut milk product separates into a lower layer of water on the bottom of the tank and an upper oily layer which contains the constituents of the coconut meat which have been pressed therefrom, said oily layer preferably having a consistency approximately of lard at ordinary temperatures, that is, temperatures between about 65° F. and 80° F. It has also been stated that the treatment time to effect separation of said components may vary from 8 to 20 hours. This is true when the separation is carried out at normal temperatures between about 65° and 70° or 80° F. However, at lower temperatures it will take less time and if the temperature is higher, it will take a longer time. The period of 8 to 20 hours is merely illustrative.

What is claimed is:

1. The method of producing a coconut extract comprising treating finely divided coconut meat with a substantial amount of water having a temperature between about 100° F. and about 150° F., and thereby forming an aqueous dispersion of coconut aqueous pulp dispersion having a sirupy consistency, subjecting said pulp to pressure to express therefrom coconut milk containing the expressible constituents of the coconut meat including coconut oil, separating the expressed liquor from the solid components of the pulp, separating the expressed liquor of the coconut meat during a time period between about 8 and about 20 hours and at a temperature between about 65° F. and 80° F. into an aqueous component and a lard-like layer of coconut oil containing impurities, said period of separation being of such a short duration as to prevent fermentation of the lard-like layer of coconut oil, heating said lard-like layer of coconut oil to remove residual water therefrom, removing any residual solid components from the so-treated material to form virgin coconut oil, treating the latter with a mixture of alcohol and hot water while agitating the mixture in a container chemically inert with respect to the mixture and thereby extracting from the virgin coconut oil alcohol-soluble impurities, cooling the extracted mass, separating the extracted mass into coconut oil and an aqueous alcohol solution containing the alcohol-extracted flavoring constituents of said coconut oil, said alcohol solution containing essence of coconut, and forming a raw concentrate adapted to be diluted, carbonated, and bottled as a beverage.

2. The method of producing a coconut extract comprising treating finely divided coconut meat with between about 35% and about 60% of water by weight taken on the coconut meat, said water having a temperature between about 100° F. and about 150° F., and thereby forming an aqueous dispersion of coconut aqueous pulp dispersion having a sirupy consistency, subjecting said pulp to pressure to express therefrom coconut milk containing the expressible constituents of the coconut meat including coconut oil, separating the expressed components from the solid components, separating the expressed components of the coconut meat during a time period between about 8 and about 20 hours and at a temperature between about 65° F. and 80° F. into an aqueous component and a lard-like layer of coconut oil containing impurities, said period of separation being of such a short duration as to prevent fermentation of the lard-like layer of coconut oil, heating said lard-like layer of coconut oil to remove residual water therefrom, filtering the so-treated material, the filtrate forming virgin coconut oil, treating the latter with a mixture of alcohol and hot water while agitating the mixture in a container chemically inert with respect to the mixture and thereby extracting from the virgin coconut oil alcohol-soluble impurities, cooling the extracted mass, separating the extracted mass into coconut oil and an aqueous alcohol solution containing the alcohol-extracted flavoring constituents of said coconut oil, said alcohol solution containing essence of coconut, and forming a raw concentrate adapted to be diluted, carbonated, and bottled as a beverage.

3. The method of producing a coconut extract comprising crushing the shell of a coconut, separating the coconut meat from the shell, crushing the separated coconut meat to a relatively fine state, treating the finely divided coconut meat with a substantial amount of water having a temperature between about 100° F. and about 150° F. and thereby forming an aqueous dispersion of coconut pulp having a sirupy consistency, introducing said aqueous dispersion of coconut pulp into a press and onto a screen present in said press having a mesh size finer than the size of the coconut particles present in said dispersion, subjecting the so-disposed coconut pulp to pressure to express therefrom expressible constituents including coconut oil, most of the solids of the pulp remaining on said screen, introducing the resulting expressed coconut milk liquor into a treatment-vessel and maintaining the expressed liquor in a relatively quiescent state at a temperature between about 65° F. and about 80° F. for a period of time between about 8 and about 20 hours whereby the coconut milk liquor separates into an aqueous component, and a lard-like layer of coconut oil containing some impurities, said period of separation being of such a short duration as to prevent fermentation of the lard-like layer of coconut oil, heating said lard-like layer of coconut oil to remove residual water therefrom, removing any residual solid components from the so-treated material to form virgin coconut oil, treating the latter with a mixture of alcohol and hot water while agitating the mixture in a container chemically inert with respect to the mixture and thereby extracting from the virgin coconut oil alcohol-soluble impurities, cooling the extracted mass, separating the extracted mass into coconut oil and an aqueous alcohol solution containing the alcohol-extracted flavoring constituents of said coconut oil, said alcohol solution containing essence of coconut, and forming a raw concentrate adapted to be diluted, carbonated, and bottled as a beverage.

References Cited in the file of this patent

UNITED STATES PATENTS

| | | |
|---|---|---|
| 1,840,798 | Tressler | Jan. 12, 1932 |
| 1,998,375 | Luque | Apr. 16, 1935 |